3,293,395
ELECTROLYTES FOR ELECTROLYTIC
LEVEL SWITCHES
Kenneth C. Halliday, Jr., Port Washington, N.Y., assignor to The Bendix Corporation, a corporation of Delaware
No Drawing. Original application Apr. 1, 1963, Ser. No. 269,766. Divided and this application Oct. 8, 1965, Ser. No. 494,262
11 Claims. (Cl. 200—152)

The present application is a division of copending U.S. application Serial No. 269,766, filed April 1, 1963, by Kenneth C. Halliday, Jr., and assigned to The Bendix Corporation, assignee of the present invention.

The invention relates generally to electrolytic level switches and in particular to electrolytes used in such switches.

Electrolytic level switches are devices which have variable electrical characteristics in response to their orientation in a force field, which usually is a gravity force field. The mechanical details of their constructions are not of concern in this invention, which is limited to the chemical constituents of the switch, as they may be liquids, gases, or solids, and mixtures thereof. The electrolytes of this invention are appropriate to a variety of level switch constructions; which include but are not limited to those described in F. Cid, U.S. Patent No. 2,890,430, assigned to the same assignee as the present application.

In a generalized switch construction, there is an envelope including at least two electrodes, all hermetically sealed to contain the liquid electrolyte (i.e. liquid phase component) and a gas bubble (i.e. gas phase components). The liquid member is an electrolyte, i.e. conducts electricity, while the gas member must be effectively an insulator.

It is further desirable that the liquid and gas remain substantially in the same volumetric equilibrium with each other over the widest practical temperature range; and particularly that no appreciable solid phase (freezing, etc.) appears at lower temperatures, and gas phase (boiling) appears at higher temperatures since this would interfere with switch response. As is well known, aqueous electrolytes are intolerant of low temperatures (i.e. salt water freezes) and suitable organic solvents for electrolytes are severely limited, cf. Moeller, T., Inorganic Chemistry, New York, Wiley, (1952) pp. 355–357.

At the serviceable upper temperature extreme of the switch, the electrolyte must not boil. As an example, consider an electrolyte of aqueous (5%) methanol and ¼ to ½ molar alkali halide. It is found that as operational temperatures rise, methanol withdraws from liquid into a gas phase resulting in super-saturation of salt in the residual liquid phase; when tilt action takes place, there occurs deposition of a semi-conductive salt on the switch walls over the wash angle. Consequently, the switch action becomes erratic and inaccurate, with the open and closed electric resistances being less sharply defined. Thus to provide an electrolytic switch suitably functionable into the region 100–125° C. some higher boiling point solvent systems are desirable.

It has been found that introducing an extra halogen component into various organic liquids that have wide bands of liquid phase across the temperature range of interest sufficiently improves the solubility of the salts enabling the total combinations to function as a satisfactory electrolyte. As an example, the halogen component may be solid phase iodine or liquid phase bromine, in amounts appropriate to maintain a liquid phase temperature tolerance in admixture with low temperature tolerant solvents. The halogen may be in organic phase, as pseudo-compounds, characterized by a dark brown or reddish solution (e.g. iodine in propyl-propionate). The pseudo-compounds contribute suitable physio-chemical characteristics to the electrolyte and comprise the types, classes and combinations defined herein.

Suitable organic solutions may be prepared from alcohols, esters, and ester alcohol mixtures. It is more appropriate to use compounds of three through twelve carbons because shorter hydrocarbon chain groups develop low boiling compounds that limit the upper temperature tolerance of the system, while longer hydrocarbon chains are of limited use due to appearance of solid phases at low temperature.

We consider first the aliphatic normal alcohols having a liquid phase in the temperature range −50° C. to +100° C. Since both methanol and ethanol have boiling points well below 100° C. and are subject to the evaporations limitations previously defined, we begin with n-propanol (which has a liquid phase at temperatures −100° C. to +98° C.) and continue with the homologous series n-butanol (−89° C. to +117° C.), n-pentanol (−78° C. to +138° C.) and n-hexanol (−51° C. to +157° C.). The lower temperature (freezing point) now becomes limiting since n-heptane freezes at −34° C.

Adding a few percent of a halogen establishes a two component system, we obtain a useful characteristic in that like atoms tolerate each other, and we can now add an alkali metal salt of the halogen to produce the electrolyte. As is well known the two-component alcohol halogen system is classified as a nonelectrolyte (Hildebrand Solubilities of Nonelectrolytes, New York, Reinhold Publishing Corporation, 1936), but using the two-compound alcohol as a carrier bi-solvent, it is transformed into a useful electrolyte for certain types of electrolytic switches. Some appropriate examples of these combinations are illustrated.

The following examples are illustrative of electrolytes falling within the scope of the invention disclosed and claimed in the parent U.S. application Serial No. 269,776. It will be understood that such examples are in no way limitations of the invention since numerous other electrolyte compositions can readily be prepared in light of the guiding principles disclosed herein.

Example 1
| | | |
|---|---|---|
| n-Propanol | cc__ | 100 |
| Iodine | grams__ | 12.7 |
| Sodium iodide | do____ | 5.1 |

Example 2
| | | |
|---|---|---|
| n-Butanol | cc__ | 100 |
| Iodine | grams__ | 15 |
| Sodium iodide | do____ | 7.5 |

Example 3
| | | |
|---|---|---|
| n-Pentanol | cc__ | 100 |
| Iodine | grams__ | 19.1 |
| Sodium iodide | do____ | 5.1 |

Example 4
| | | |
|---|---|---|
| n-Hexanol | cc__ | 100 |
| Iodine | grams__ | 19.1 |
| Sodium iodide | do____ | 4.5 |

Example 5
| | | |
|---|---|---|
| n-Propanol | cc__ | 100 |
| Bromine | grams__ | 12.7 |
| Sodium bromine | do____ | 5.1 |

The effectivity of the alcoholic systems is nevertheless still limited by the liquid phase spread; if this can be widened, a more desirable electrolyte can be produced. We now consider the chemicals known as esters, particularly those containing at least six carbon atoms and not more than 12 carbon atoms known as aliphatic linear esters and again limiting ourselves to those that are *not* solid above −40° C. Examples of suitable esters falling within the scope of copending divisional U.S. application Serial No. 494,230, filed October 8, 1965, by Kenneth C. Halliday, Jr., and assigned to The Bendix Corporation, assignee of the present invention include;

n-propyl-propionate (liquid in a temperature range of −75° C. to +123° C.)
n-butyl-propionate (−89° C. to +145° C.)
n-pentyl-propionate (−73° C. to +164° C.)
n-hexyl-propionate (−57° C. to +190° C.)
n-heptyl-propionate (−51° C. to +208° C.)
n-propyl-butyrate (−95° C. to +143° C.)
n-butyl-butyrate (−91° C. to +164° C.)
n-pentyl-butyrate (−73° C. to +185° C.)
n-hexyl-butyrate (−78° C. to +205° C.)
n-heptyl-butyrate (−58° C. to +275° C.)
n-octyl-butyrate (−55° C. to +244° C.)
n-propyl-valerate (−80° C. to +167° C.)
n-butyl-valerate (−92° C. to +186° C.)
n-amyl-valerate (−79° C. to +204° C.)
n-hexyl-valerate (−63° C. to +224° C.)
n-propyl-caproate (−69° C. to +185° C.)
n-butyl-caproate (−92° C. to +186° C.)
n-amyl-caproate (−47° C. to +222° C.)
n-hexyl-caproate (−55° C. to +245° C.)

Again we can establish electrolyte systems by adding free halogen to the ester then develop the electrolyte with the addition of ¼ to ½ molar halide salt. Illustrations follow.

*Example 6*

| | | |
|---|---|---|
| n-Butyl-butyrate | liter | 1 |
| Iodine | grams | 150 |
| Potassium iodide | do | 45 |

*Example 7*

| | | |
|---|---|---|
| n-Propyl-propionate | cc | 100 |
| Iodine | grams | 15 |
| Sodium iodide | do | 4.5 |

*Example 8*

| | | |
|---|---|---|
| n-Butyl-propionate | cc | 100 |
| Iodine | grams | 12 |
| Potassium iodide | do | 4 |

*Example 9*

| | | |
|---|---|---|
| n-Hexyl-caproate | cc | 100 |
| Iodine | grams | 20 |
| Sodium iodide | do | 5.1 |

*Example 10*

| | | |
|---|---|---|
| n-Propyl-propionate | cc | 100 |
| Bromine | grams | 15 |
| Sodium bromide | do | 4.5 |

The pure ester systems are not adequately time stable because of internal chemical reactions. As is well known, esterification is a reversible reaction, and under conditions that can occur in an electrolytic switch, the ester may split into its acid and alcoholic members. This would be followed by soapomification of the acid into an undesirable soap phase. It is accordingly advisable to take advantage of the "mass law" relationship to include additional alcohol so that the acid component does not get free. It is better to use symmetrical esters, which then require one alcohol without the possibility of rearranging the ester to a smaller arrangement, although nonsymmetrical esters will work satisfactorily. The alcohol used is an aliphatic normal alcohol having at least 3 carbon atoms and not more than 6 carbon atoms and a liquid phase in the temperture range of approximately −50 degrees to +100 degrees centigrade. A sufficient amount of such aliphatic normal alcohol should be added to preserve the stability of the ester without applying an excess of alcohol that will produce an alcohol type electrolyte. It has been found the ratio of approximately ⅔ ester to ⅓ alcohol is most satisfactory. Typical examples of these ester-alcohol electrolytes falling within the scope of the present invention are now defined in the following examples, wherein the halogen is present in amounts of approximately 2 to 4 times that of the alkali metal salt.

*Example 11*

| | | |
|---|---|---|
| Propyl-propionate | cc | 65 |
| Propanol | cc | 35 |
| Iodine | grams | 20 |
| Sodium iodide | do | 4.5 |

*Example 12*

| | | |
|---|---|---|
| Amyl-valerate | cc | 80 |
| n-Amyl-alcohol | cc | 20 |
| Iodine | grams | 10 |
| Sodium iodide | do | 5 |

*Example 13*

| | | |
|---|---|---|
| Butyl-butyrate | cc | 66 |
| n-Butanol | cc | 34 |
| Iodine | grams | 12.7 |
| Sodium iodide | do | 5.1 |

*Example 14*

| | | |
|---|---|---|
| Propyl-propionate | cc | 65 |
| Propanol | cc | 35 |
| Bromine | grams | 20 |
| Sodium bromide | do | 4.5 |

*Example 15*

| | | |
|---|---|---|
| Amyl-propionate | cc | 70 |
| n-Pentanol | cc | 30 |
| Iodine | grams | 19.1 |
| Sodium iodide | do | 5 |

These electrolytes constitute an improvement over the existing electrolytic switch chemicals because practical considerations dictating the selection of useful switch envelopes, electrode materials, etc. result in envelopes and electrodes of material which cause chemical changes in the electrolyte so that aside from phase stability in the temperature environment, the fluid's physio-electrical characteristics decay in time. As is well known, the alkaline-halide electrolytes heretofore used do react chemically with metal electrodes, with glass and metal envelopes, etc. of the switch. Accordingly, my improvement in electrolytes includes better compatibility with both the carbon electrodes, etc. of the above cited Cid patent as well as functionability with the noble metal electrodes used in other switches.

While the invention has been described in detail, it will be understood that various modifications may be made without departing from the essential teachings set forth herein and which are delineated in the appended claims.

What is claimed is:

1. An electrolyte for use in a level switch, consisting essentially of a liquid solution in an aliphatic linear ester having at least 6 carbon atoms and not more than 12 carbon atoms and having a liquid phase above −40 degrees centigrade and an aliphatic normal alcohol having at least 3 carbon atoms and not more than 6 carbon atoms and having a liquid phase in a temperature range of approximately −50 degrees to +100 degrees centigrade, of a halogen selected from the group consisting of iodine and bromine and an alkali metal salt of the halogen selected from the group consisting of sodium bromide and sodium iodide, the alcohol and the ester being present in amounts of approximately ⅓ and ⅔, respectively, the alkali metal salt being present in amounts of approximately 4 to 5 grams per 100 cubic centimeters of alcohol and ester and the halogen being present in amounts of approximately 2 to 4 times that of the alkali metal salt.

2. An electrolyte in accordance with claim 1 wherein the halogen is iodine and the alkali metal salt is sodium iodide.

3. An electrolyte in accordance with claim 1 wherein the halogen is bromine and the alkali metal salt is sodium bromide.

4. An electrolyte in accordance with claim 1 wherein the ester is n-propyl-propionate and the alcohol is n-propanol.

5. An electrolyte in accordance with claim 1 wherein the ester is amyl-propionate and alcohol is n-pentanol.

6. In a liquid level switch which includes a closed receptacle containing an electrolyte and electrodes having a surface adapted to contact said electrolyte to provide a current conducting path between said electrolyte and said electrodes, the improvement wherein said electrolyte consists essentially of a liquid solution in an aliphatic linear ester having at least 6 carbon atoms and not more than 12 carbon atoms and having a liquid phase above −40 degrees centigrade and an aliphatic normal alcohol having at least 3 carbon atoms and not more than 6 carbon atoms and having a liquid phase in the temperature range −50 degrees to +100 degrees centigrade, of sodium iodide and iodine, the ester being present in amounts greater than the amounts of alcohol, and the iodine being present in amounts greater than the amounts of sodium iodide with the iodine and sodium iodide being present in amounts of approximately 15 to 25 grams per 100 cubic centimeters of ester and alcohol.

7. In a liquid level switch which includes a closed receptacle containing an electrolyte and electrodes having a surface adapted to contact said electrolyte to provide a current conducting path between said electrolyte and said electrodes, the improvement wherein said electrolyte consists essentially of a liquid solution in an aliphatic linear ester having at least 6 carbon atoms and not more than 12 carbon atoms and having a liquid phase above −40 degrees centigrade and an aliphatic normal alcohol having at least 3 carbon atoms and not more than 6 carbon atoms and having a liquid phase in a temperature range of approximately −50 degrees to +100 degrees centigrade of alkali metal salt and a halogen, the ester being present in amounts greater than the amounts of alcohol, and the halogen being present in amounts greater than the amounts of the alkali metal salt, with the halogen and the alkali metal salt being present in amounts of approximately 15 to 25 grams per 100 cubic centimeters of the ester and alcohol.

8. The improvement defined by claim 7 wherein the amount of the ester is at least twice as great as the amount of the alcohol.

9. The improvement defined by claim 7 wherein said ester is propyl-propionate and alcohol is n-propanol.

10. In a liquid level switch which includes a closed receptacle containing an electrolyte and electrodes having a surface adapted to contact said electrolyte to provide a current conducting path between said electrolyte and said electrodes, the improvement wherein said electrolyte consists essentially of a liquid solution in an aliphatic linear ester having at least 6 carbon atoms and not more than 12 carbon atoms and having a liquid phase above −40 degrees centigrade and an aliphatic normal alcohol having at least 3 carbon atoms and not more than 6 carbon atoms and having a liquid phase in the temperature range −50 degrees to +100 degrees centigrade of alkali metal bromide and bromine, the ester being present in amounts greater than the amounts of alcohol, and the bromine being present in amounts greater than the amounts of alkali metal bromide with the bromine and alkali metal bromide being present in amounts of approximately 15 to 25 grams per 100 cubic centimeters of ester and alcohol.

11. The improvement defined by claim 8 wherein the halogen is selected from a group consisting of iodine and bromine, and the alkali metal salt is selected from a group consisting of iodide and bromide of sodium.

References Cited by the Examiner

UNITED STATES PATENTS

| | | | |
|---|---|---|---|
| 2,250,212 | 7/1941 | Suits | 252—62.2 |
| 2,387,313 | 10/1945 | Wilson | 338—44 X |
| 2,713,726 | 7/1955 | Dixson | 338—44 X |
| 2,764,653 | 9/1956 | Schoeppel | 220—152.10 |
| 2,852,646 | 9/1958 | Broadley | 338—44 |
| 2,927,987 | 3/1960 | Uhl | 200—152.10 |

TOBIAS E. LEVOW, *Primary Examiner.*

R. D. EDMONDS, *Assistant Examiner.*